United States Patent [19]

Bergmeister et al.

[11] Patent Number: 5,648,439
[45] Date of Patent: Jul. 15, 1997

[54] PROCESS FOR PRODUCING POLYOLEFINS

[75] Inventors: Joseph J. Bergmeister, Bartlesville, Okla.; Scott E. Kufeld, Webster, Tex.; Max P. McDaniel, Bartlesville, Okla.

[73] Assignee: Phillips Petroleum Company, Bartlesville, Okla.

[21] Appl. No.: 503,069

[22] Filed: Jul. 14, 1995

Related U.S. Application Data

[63] Continuation of Ser. No. 202,302, Feb. 25, 1994, abandoned.

[51] Int. Cl.$^6$ .................................................. C08F 4/24
[52] U.S. Cl. .......................... 526/96; 526/106; 526/118; 526/119; 526/348.2; 526/348.4; 526/348.5; 526/348.6; 526/351; 526/352; 502/113
[58] Field of Search .................. 526/96, 106, 114, 526/118, 119, 134, 348.2, 348.4, 348.5, 348.6, 351, 352

[56] References Cited

U.S. PATENT DOCUMENTS

| | | | |
|---|---|---|---|
| 3,135,809 | 6/1964 | Bosmajian | 260/650 |
| 3,887,494 | 6/1975 | Dietz | 252/452 |
| 4,364,842 | 12/1982 | McDaniel et al. | 252/430 |
| 4,364,855 | 12/1982 | McDaniel et al. | 252/437 |
| 4,397,765 | 8/1983 | McDaniel | 252/430 |
| 4,424,139 | 1/1984 | McDaniel et al. | 502/117 |
| 4,444,962 | 4/1984 | McDaniel et al. | 526/95 |
| 4,444,964 | 4/1984 | McDaniel et al. | 526/105 |
| 4,504,638 | 3/1985 | McDaniel et al. | 526/134 |
| 4,530,914 | 7/1985 | Ewen et al. | 502/113 |
| 4,690,990 | 9/1987 | McDaniel et al. | 526/138 |
| 4,803,253 | 2/1989 | McDaniel et al. | 526/352.2 |
| 4,806,513 | 2/1989 | McDaniel et al. | 502/107 |
| 4,935,474 | 6/1990 | Ewen et al. | 526/114 |
| 4,939,217 | 7/1990 | Stricklen | 526/114 |
| 4,975,403 | 12/1990 | Ewen | 502/113 |
| 5,032,562 | 7/1991 | Lo et al. | 502/111 |
| 5,032,651 | 7/1991 | McDaniel et al. | 526/96 |
| 5,037,911 | 8/1991 | McDaniel et al. | 526/130 |
| 5,064,797 | 11/1991 | Stricklen | 502/111 |
| 5,104,839 | 4/1992 | McDaniel et al. | 502/113 |
| 5,110,214 | 5/1992 | Battiste et al. | 374/45 |
| 5,182,244 | 1/1993 | Pettijohn | 502/110 |
| 5,237,025 | 8/1993 | Benham et al. | 526/114 |
| 5,310,834 | 5/1994 | Katzen et al. | 526/114 |

*Primary Examiner*—David W. Wu
*Attorney, Agent, or Firm*—Lynda S. Jolly

[57] ABSTRACT

A process is provided to produce polyolefins having a multimodal molecular weight distribution at the molecular level by contacting at least one mono-1-olefin in a polymerization zone, under polymerization conditions, with two different types of supported chromium catalyst systems. The first catalyst system comprises a chromium oxide catalyst system which comprises chromium oxide supported on an inorganic oxide. The second catalyst system comprises a chromocene catalyst system which comprises chromocene supported on an inorganic oxide. The resultant, recovered polymer has a multimodal, or at least a bimodal, molecular weight distribution.

24 Claims, No Drawings

PROCESS FOR PRODUCING POLYOLEFINS

This application is a continuation of application Ser. No. 08/202,302, filed Feb. 25, 1994 the entirety of which is herein incorporated by reference, now abandoned.

BACKGROUND OF THE INVENTION

This invention relates to a method for preparing polyolefins having a multimodal molecular weight distribution.

Polyolefins having a multimodal molecular weight distribution (MWD), such as polyethylene, can be mad into articles by a variety of methods, including, but not limited to, extrusion molding, thermoforming and rotational molding, and have advantages over typical polyolefins lacking a multimodal MWD. Polyolefins having a multimodal MWD process more easily, i.e., they can be processed at a faster throughput rate with lower energy requirements, and at the same time such polymers exhibit reduced melt flow perturbations and are preferred because of improved properties for applications such as blow molding and/or high strength films. Polymers having a multimodal MWD are generally characterized by having a broad MWD, or more that one MWD peak, as reflected by size exclusion chromatography (SEC) curves.

There are several known methods of producing polyolefins having a multimodal MWD; however, each method has its own disadvantages. Polyolefins having a multimodal MWD can be made by employing two distinct and separate catalyst systems in the same reactor, each producing a polyolefin having a different MWD; however, catalyst feed rates are usually difficult to control and the catalysts can have a detrimental effect on each other. Polymer particles produced from a dual, or even multi-, catalyst system frequently are not uniform in size. Thus, segregation of the polymer during storage and transfer can produce non-homogeneous products.

A polyolefin having a bimodal, MWD can also be made by sequential polymerization in two or more separate reactors or blending polymers of different MWD during processing; however, both of these methods increase capital cost, and problems discussed earlier regarding polymer segregation can occur.

Multimodal MWD polyethylenes can also be obtained directly from a single reactor polymerization process in the presence of a catalyst system comprising two or more catalytic sites, such as, for example, metallocenes, wherein each site has different propagation and termination rate constants. At certain ratios, and in certain polymerization processes, even catalysts that have two different catalytic sites can produce a monomodal, or narrow, MWD polyolefin. Unfortunately, even under ideal conditions, a dual site catalyst system can have decreased catalytic activity. While not wishing to be bound by theory, it is hypothesized that a metallocene can bind to, and therefor inhibit the reactivity of, some of the active chromium oxide catalytic sites. Unfortunately, there are limits to known methods of preparing these very desirable, bimodal molecular weight distribution or multimodal molecular weight distribution polyolefins.

SUMMARY OF THE INVENTION

It is an object of the prevent invention to produce polyolefins having a multimodal, or broadened, molecular weight distribution.

It is a further object of the present invention to provide an improved process of making polyolefins having a multimodal, or broadened, molecular weight distribution.

In accordance with the present invention, polyolefins having a multimodal molecular weight distribution at the molecular level are prepared by contacting at least one mono-1-olefin in a polymerization zone, under polymerization conditions, with two different types of supported chromium catalyst systems. The first catalyst system comprises a chromium oxide catalyst system which comprises chromium oxide supported on an inorganic oxide. The second catalyst system comprises a chromocene catalyst system which comprises chromocene supported on an inorganic oxide. In a preferred embodiment, the first catalyst system consists essentially of a chromium oxide catalyst system which comprises chromium oxide supported on an inorganic oxide. The second catalyst system consists essentially of a chromocene catalyst system which comprises chromocene supported on an inorganic oxide. In another embodiment of this invention, the above-described dual catalyst system can be used to polymerize olefins. The resultant, recovered polymer has at least a multimodal, or broad, molecular weight distribution.

DESCRIPTION OF THE PREFERRED EMBODIMENTS

CATALYST SYSTEMS

As used in this disclosure, the term "support" refers to a carrier for another catalytic component. However, by no means, is a support necessarily an inert material; it is possible that a support can contribute to catalytic activity and selectivity.

Any support useful to support chromium catalyst systems can be used. Exemplary catalyst supports include, but are not limited to, inorganic oxides, either alone or in combination, phosphated inorganic oxides, and mixtures thereof. Particularly preferred are supports selected from the group consisting of silica, silica-alumina, alumina, fluorided alumina, silated alumina, thoria, aluminophosphate, aluminum phosphate, phosphated silica, phosphated alumins, silica-titania, coprecipitated silica/titania, and mixtures thereof, fluorided/silated alumina, as well as any one or more of these supports which can contain chromium.

The presently most preferred catalyst support, because of greatest polymerization activity, is aluminophosphate, herein after also referred to as $AlPO_4$, as disclosed in U.S. Pat. No. 4,364,855 (1982), herein incorporated by reference. Generally, the P/Al molar ratio in the aluminophosphate support is within a range of about 0.2 to about 1.0 and preferably, within a range of 0.4 to 0.9 for best catalyst system productivity and activity. Preferably, an aluminophosphate support is activated prior to use. Activation of the support can occur under any ambient, at a temperature within a range of about 200° C. to about 1000° C., preferably from 400° C. to 650° C. for best catalyst system activity and productivity.

In the description herein, the terms "cogel" and "cogel hydrogel" are arbitrarily used to describe cogellation of at least two catalyst system components, such as, for example, silica and titania and/or aluminophosphate and chromium. The term "tergel" is used to describe the product resulting from gelation together of silica, titania, and chromium. Such terms are disclosed in U.S. Pat. No. 3,887,494 (1975), herein incorporated by reference. "Hydrogel" is defined as a support component containing water. "Xerogel" is a support component which has been dried and is substantially water-free.

Novel catalyst systems useful in this invention comprise a blend of two different, inorganic oxide supported catalyst systems. The first catalyst system must be a supported chromium-oxide type catalyst system. One component of the first catalyst system must be a chromium compound. The chromium compound, or component, can be combined with a support component in any manner known in the art, such as, for example, forming a co-precipitated tergel. Alternatively, an organic solution, such as, for example, an alcohol solution, of a soluble chromium component can be added to a xerogel support component. While not wishing to be bound by theory, it is believed that use of water in this invention to impregnate a support with a chromium compound can cause collapse of the pores in the support, and therefor, a decrease in catalyst system productivity. Suitable chromium compounds include, but are not limited to, chromium nitrate, chromium acetate, and chromium trioxide. Alternatively, a solution of a hydrocarbon soluble chromium component, such as tertiary butyl chromate, a diarene chromium compound, bis-cyclopentadienyl chromium(II) or chromium acetylacetonate, can be used to impregnate a xerogel support.

The chromium component can be used in any amount sufficient to provide polymerization catalytic activity. Generally, an amount sufficient to give from about 0.05 to about 5, preferably about 0.5 to about 2 weight percent chromium, based on the total weight of the chromium and support after activation, can be used.

The resulting chromium component on an inorganic oxide support then must be subjected to activation, or calcination, in an oxygen-containing ambient in any manner conventionally used in the art. Because of economy, the preferred oxygen-containing ambient is air, most preferably dry air to maintain catalyst system integrity for best catalytic activity and productivity. The activation can be carried out at an elevated temperature for about ½ to about 50 hours, preferably about 2 to about 10 hours, at a temperature within a range of about 400° to about 900° C. Under these conditions, at least a substantial portion of any chromium in a lower valence state is converted to a hexavalent form.

A preferred, second type of supported chromium-oxide catalyst system useful as the first catalyst system component is prepared when the resulting, previously activated, supported catalyst system is cooled and subjected to at least a partial reduction of the hexavalent chromium to a lower valence state. Preferably, a substantial portion of the chromium will be in a divalent state after the reduction process in order to achieve better polymerization activity and productivity.

The reducing agent most preferably is carbon monoxide due to ease of use, availability and safety, based on the safety of other reducing agents. The reducing agent can be employed at temperatures between about 300° to about 500° C., although a reducing agent is more often employed at temperatures within a range of about 350° to about 450° C. The partial pressure of the reducing gas in the reduction operation can be varied from sub-atmospheric pressures to relatively high pressures, but the simplest commercial reducing operation is to utilize a dilute solution of a pure reducing agent at about atmospheric pressure. Usually, a solution of about 10%, by volume, carbon monoxide in an inert ambient, such as, for example, nitrogen and/or argon, can be used. If desired, neat reducing agent, such as, for example, undiluted carbon monoxide, can be used.

The reduction time can vary from a few minutes to several hours or more. The extent of reduction can be followed by visual inspection of catalyst system color. The color of the initial oxygen-activated catalyst system is generally orange, indicating the presence of hexavalent chromium. The color of the reduced catalyst system preferably employed in the invention is blue, indicating that all or substantially all of the initial hexavalent chromium has been reduced to lower oxidation states, generally a divalent state.

The course of the reduction action of the air-activated orange catalyst system with a reducing agent can be determined exactly by pulse titration. A known amount of reducing agent is added per pulse and the amount of evolved, oxidized reducing agent is measured. When reduction is complete, only reducing agent will be present and the catalyst system is blue in color. The blue, reduced catalyst system can be titrated with pulses of oxygen or any oxidizing agent, to convert the catalyst system back to the original orange color. When oxidation is complete, the oxidizing agent will be evident in the off-gas.

After reduction, an inert atmosphere, such as argon or nitrogen, is used to flush out the reducing agent from the reduced, supported first catalyst system component. After the flushing treatment, the first catalyst system is cooled to about room temperature, e.g. about 25° C., and is kept under an inert atmosphere, and preferably away from contact with either a reducing agent or an oxidizing agent.

The second catalyst system useful in this invention must be a member of the chromocene family of compounds which is supported, or deposited, on an activated aluminophosphate support. The parent compound of the chromocene family is an organometallic coordination compound, also called a metallocene. The chromocene portion of the second catalyst system component comprises a cyclopentadienyl (Cp), preferably a bis-cyclopentadienyl ($Cp_2$) chromium compound. Such compounds are considered aromatic and are depicted by a formula such as $(C_5H_5)_2Cr$ wherein a chromium atom is "sandwiched" between two cyclopentadienyl rings. Exemplary chromocenes employed in accordance with this invention are represented by the general formulae $(C_5R'm)R"s(C_5R'm)Cr$, $(C_5R'm)R"s(C_5R'm)CrQ$ and $(C_5R'm)CrQ$ wherein $(C_5R'm)$ is cyclopentadienyl or substituted cyclopentadienyl, each R' can be the same or different and is selected from hydrogen or a hydrocarbyl radical selected from alkyl, alkenyl, aryl, alkylaryl, or arylalkyl radicals having from about 1 to about 20 carbon atoms or two adjacent carbon atoms are joined together to form a $C_4$–$C_6$ ring, R" is a $C_1$–$C_4$ alkylene radical, a dialkyl germanium or silicone or alkyl phosphine amine radical bridging two $(C_5R'm)$ rings, Q is a hydrocarbon radical such as aryl, alkyl, alkenyl, alkylaryl, or arylalkyl radicals having from about 1 to about 20 carbon atoms or halogen and can be the same or different, s is 0 or 1, and m is 4 when s is 1 and m is 5 when s is 0.

The term "bis-(cyclopentadienyl)chromium(II) compound" includes not only bis-(cyclopentadienyl)-chromium (II) but substituted derivatives thereof in which the cyclopentadienyl rings contain one or more substituents which do not affect the ability of the adsorbed substituted bis-(cyclopentadienyl)chromium(II) compound to function as an ethylene polymerization catalyst. The specific bis-(cyclopentadienyl)chromium (II) compound, bis-(cyclopentadienyl)chromium(II), sometimes called chromocene, has the following postulated structure:

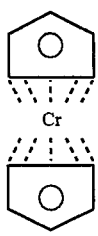

Other exemplary bis-(cyclopentadienyl)chromium(II) compounds include, but are not limited to, bis-(fluoroenyl) chromium(II)

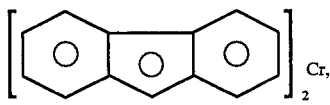

and bis-(indenyl)chromium(II),

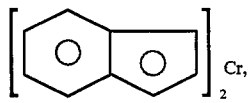

as well as bis-(cyclopentadienyl)chromium(II) compounds having substituted ligands of the formula

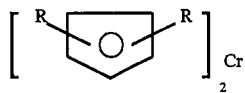

where one or both R groups are selected from 1–6 carbon atom alkyl radicals. These materials can be thought of as a divalent cation (chromium) coordinated by two negatively charged cyclopentadienyl ligands.

Bis-(cyclopentadienyl)chromium(II) compounds are solids which are soluble in many organic solvents. Preferred solvents are non-polar liquids used at ambient temperatures. Types of suitable solvents include, but are not limited to, alkanes, cycloalkanes, alkenes, and aromatic hydrocarbons. Exemplary solvents include pentane, n-hexane, heptane, decane, cyclohexane, methylcyclohexane, benzene, xylenes, and mixtures of two or more thereof. Preferably, a sufficient quantity of a solution of the chromium component is used to completely wet the aluminophosphate support and fill the porous support structure to insure even distribution of the chromium compound on the support. Generally, the chromium-containing organic solvent solution used to impregnate the support contains from about 0.002 to about 25 weight percent organochromium compound.

A sufficient volume of the solution of the organochromium compound is taken so as to provide from about 0.01 to about 10, preferably about 0.05 to about 5, more preferably from 0.1 to 2 weight percent chromium, based on the weight of the support. Contacting the support and organochromium solution can be effected in any conventional way, such as, for example, by slurrying, and can be at any convenient temperature. Generally, ambient temperature is used, although temperatures ranging from about the freezing point of the solvent to as high as about 300° F. can be employed during the contacting period. Any pressure can be used, although preferred pressures are those which can maintain the solvent in a liquid phase, for ease of contacting. Contact times from a few seconds to several hours are adequate. The same stoichiometric amounts of chromium and support can be used when the chromocene is added as a separate stream to the reactor and contacted with the support in-situ.

The incorporation of the chromocene component onto the activated base is preferably carried out in an inert atmosphere, such as nitrogen and/or argon and the resulting catalyst is maintained in an inert atmosphere or under vacuum until it is used.

Commonly used polymerization cocatalysts can be used, if desired, but are not necessary. Exemplary cocatalysts include, but are not limited to, metal alkyl, or organometal, cocatalysts, i.e., alkyl boron and/or alkyl aluminum compounds, which can alter melt flow characteristics (melt index or high load melt index) of the resultant polymer. The term "metal" in organometal is intended to include boron. While not wishing to be bound by theory, it is believed a cocatalyst can act as a scavenger for catalyst system poisons.

If the cocatalyst is a trihydrocarbylboron compound, a trialkyl boron compound is preferred, wherein the alkyl groups have from about 1 to about 12 carbon atoms and preferably, from 2 to 5 carbon atoms per alkyl group. Trialkyl boron compounds, such as, for example, tri-n-butyl borane, tripropylborane, and triethylborane (TEB) are preferred cocatalysts because these compounds are effective agents to improve polymer properties, such as, for example, to reduce melt flow and retard polymer swelling during polymerization. Other suitable boron compounds include trihydrocarbyl boron compounds broadly; triaryl boron compounds, such as, for example, triphenylborane; boron alkoxides, such as, for example, $B(OC_2H_5)_3$; and halogenated alkyl boron compounds, such as, for example, $B(C_2H_5)Cl_2$. By far, the most preferred cocatalyst is triethylborane, for the reasons given above.

Also suitable are aluminum compounds of the formula $AlR'nX_{3-n}$ where X is a hydride or halide, R' is a 1 to 12 carbon atom hydrocarbyl radical and n is an integer of 1 to 3. Triethylaluminum (TEA) and diethylaluminum chloride are particularly suitable.

A cocatalyst, when used, can be used in an amount within a range of about 0.5 to about 20 parts per million (ppm), or milligrams per kilogram (mg/kg), based on the mass of the diluent in the reactor. Preferably, the cocatalyst is used in an amount within a range of 1 to 12 mg/kg, for cost effectiveness and best resultant polymer properties. Expressed in other terms, a cocatalyst can be present in an amount so as to give an atom ratio of metal to chromium within a range of about 0.5:1 to about 10:1, preferably 2:1 to 5:1.

The cocatalyst can either be premixed with a catalyst system or added as a separate stream to the polymerization zone, the latter being preferred.

Reactants and Reaction Conditions

Polymerization can be carried out in any manner known in the art, such as gas phase, solution or slurry conditions, to effect polymerization. A stirred reactor can be utilized for a batch process, or the reaction can be carried out continuously in a loop reactor or in a continuous stirred reactor.

A preferred polymerization technique is that which is referred to as a particle form, or slurry, process wherein the temperature is kept below the temperature at which polymer goes into solution. Such polymerization techniques are well known in the art and are disclosed, for instance, in Norwood, U.S. Pat. No. 3,248,179, the disclosure of which is hereby incorporated by reference.

The preferred temperature in the particle form process is within a range of about 185° to about 230° F. (85° to 110°

C.), although higher and lower temperatures can be used. Two preferred polymerization methods for the slurry process are those employing a loop reactor of the type disclosed in Norwood and those utilizing a plurality of stirred reactors either in series, parallel or combinations thereof wherein the reaction conditions are different in the different reactors. For instance, in a series of reactors a chromium oxide catalyst system can be utilized either before or after a reactor utilizing a supported chromocene catalyst system. In another specific instance, a conventional, supported chromium oxide catalyst system can be utilized in a reactor in parallel with a reactor utilizing a supported chromocene catalyst system and the resulting polymerization products combined prior to recovering the polymer.

The molecular weight of the polymer can be controlled by various means known in the art such as adjusting the temperature (higher temperature giving lower molecular weight) and introducing, or varying the amount of, hydrogen to alter the molecular weight, or varying the catalyst system weight ratios.

Polymer Characteristics

Polymers produced in accordance with this invention have at least a multimodal, or broad, molecular weight distribution; reduced density, especially on the high molecular weight end of the product polymer MWD; and increased density, especially on the low molecular weight end of the product polymer MWD. This catalyst system composition most preferably is applicable for use with ethylene polymerization, with the addition of a comonomer and/or in-situ comonomer production.

The resultant polymer will usually have a density within a range of about 0.94 to about 0.98 g/cc, and preferably within a range of about 0.94 to about 0.965 g/cc. Most preferably, if the polymer is to be made into film, a density within a range of 0.94 to 0.95 g/cc is preferred and, for blow molding, a density within a range of 0.95 to 0.96 g/cc is preferred. The melt index (MI) of the polymer is usually within a range of about 0.015 to about 0.7 g/10 mins and preferably within a range of about 0.02 to about 0.5 g/10 mins. Most preferably, if polymer is to be made into film, the MI is within a range of 0.04 to 0.1 g/10 mins and, for blow molding, a MI within a range of 0.04 to 0.2 g/10 mins is preferred. The HLMI of the resultant polymer will usually be within a range of about 1 to about 175 g/10 mina and preferably within a range of about 4 to about 70 g/10 mins. Most preferably, if the polymer is to be made into film, the HLMI is within a range of 9 to 18 g/10 mins and, for blow molding, a HLMI within a range of 10 to 40 g/10 mins is preferred. The shear ratio (HLMI/MI) is usually within a range of about 40 to about 300, and preferably within the range of about 75 to 250. Polymers with characteristics within the given ranges are especially useful for blow molding and/or film production applications.

EXAMPLES

The following Examples illustrate various aspects of the invention. Data are included for each example about the polymerization conditions, as well as the resultant polymer. All chemical handling, including reactions, preparation and storage, was performed under a dry, inert atmosphere (usually nitrogen). Unless otherwise indicated, bench scale polymerizations were completed in a 2 or 2.65 liter autoclave reactor at 95° C. using an isobutane (1 or 1.2 liter, respectively) slurry. Approximately 0.08 grams of conventional, supported chromium oxide catalyst system was charged to the reactor against a counter current of isobutane. If hydrogen was charged to the reactor, hydrogen addition was followed by isobutane. Isobutane was flushed into the reactor with a small amount of ethylene. Where applicable, 1-hexene was added, followed by ethylene to bring the total reactor pressure to 550 psig. In some cases, 1-hexene was charged half-way through the isobutane charge. Co-catalysts, if used, were added half-way through the isobutane charge or with the 1-hexene. Ethylene was fed on demand and polymerization reaction time usually was about 60 minutes.

Chromium oxide catalyst systems which are available from Davison Chemical Company, a division of W. R. Grace, included a 969MSLF catalyst system which is about a one (1) weight percent chromium on a silica support; a 969ID catalyst system which is about a one (1) weight percent chromium on a silica support; a Magnapore catalyst system and is about a one (1) weight percent chromium on a high pore volume, high surface area silica-titania; and a Sylopore catalyst system which is about a one (1) weight percent chromium on a low pore volume, low surface area silica-titania. All chromium oxide catalyst systems were prepared in accordance with U.S. Pat. No. 3,887,494 and activated in air for about 3 hours, at 500°–700° C., cooled to 400° C., flushed with nitrogen and reduced in carbon monoxide at 370° C. for 30 minutes, and finally flushed with nitrogen.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C. High load melt index (HLMI, g/10 mins) was determined in accordance with ASTM D1238 at 190° C. with a 21,600 gram weight. Melt index (MI, g/10 mins) was determined in accordance with ASTM D1238 at 190° C. with a 2,160 gram weight. Environmental Stress Crack Resistance (ESCR, hrs) was determined according to ASTM D1693, Conditions A and/or C. Flexural modulus (Flex Mod, Kpsi) was determined in accordance with ASTM D790, 2 inch span, 1 mm cross head speed. Dart impact (g) was determined according to ASTM D1709-75 and is the energy needed to rupture 1 mil thick film upon impact of a free falling dart. This method establishes the mass of the dart dropped from a height of 26" which causes 50% of the samples to break. The staircase method is used to determine the 50% failure level and the missile mass increment is 15 g. In all instances, the film was 1 mil in thickness, unless otherwise indicated. Tear resistance (g/mil) was determined according to ASTM D1922 and is a modification for polymer film adapted from the Elmendorf tear test used for paper. This method determines the average force in grams required to propagate a tear through 2.5" of film in the machine extrusion direction (MD) or transverse direction (TD) as indicated. In all instances, the film was 1 mil in thickness. Spencer impact resistance (J) was determined according to ASTM D3420. Analyses for smoke were visual, subjective determinations. Size exclusion chromatography (SEC) analyses were performed at 140° C. on a Waters, model 150 GPC with a refractive index detector. A solution concentration of 0.25 weight percent in 1,2,4-trichlorobenzene was found to give reasonable elution times.

Example 1

This Example shows polymerization reactions to prepare a comparative, monomodal, low molecular weight polymer product. A 40–70 mg portion of calcined aluminophosphate support was placed in a small filter tube and slurried with 2 mL hexane. Then, 0.8–1.4 mL of CrCp$_2$ (Cr(C$_5$H$_5$)$_2$) in hexane solution (1 mg Cr/mL) was added, and the slurry was stirred. After about 1 minute, the red-orange CrCp$_2$ solution became clear and the support turned black. The supported CrCp$_2$ slurry was filtered and washed two times with 3 mL hexane, always taking care not to let the supported CrCp$_2$ become dry. The chromocene loading on the support was about 2 wt. % in all Runs. The slurry volume was brought to 4 mL with hexane and 0.3 mL of 0.5 weight percent triethylaluminum (TEA), in heptane, was added. The slurry was drawn into a syringe, taken out of the dry box, and charged to a polymerization reactor. No comonomer was affirmatively added to each Run; hydrogen was added at 35 psi to the reactor; all Runs were at 95° C.

The results of the polymerization runs are listed below in Table 1.

Example 2

Catalysts systems were prepared and polymerization reactions were carried out similar to Example 1, except that 1-hexene was introduced into the polymerization reactor. Runs 201–207 had 0.3 mL of 0.5 weight percent of TEA, in heptane, added to the reactor and Run 208 had 0.5 mL of 1.0 weight percent TEB, in heptane, added to the reactor. The polymeric products were evaluated by $^{13}$C NMR for comonomer incorporation. The results are listed below in Table 2.

TABLE 2

| Run No. | Support P/Al Molar Ratio | Support Activ'n. Temp °C. | 1-Hexene mL | MI, g/10 mins | Butyl Branches/ 1000C |
|---|---|---|---|---|---|
| 201 | 0.3 | 450 | 0 | 80 | 0 |
| 202 | 0.3 | 450 | 40 | 114 | 0 |
| 203 | 0.6 | 450 | 0 | 99 | 0 |
| 204 | 0.6 | 450 | 20 | 128 | 0 |
| 205 | 0.6 | 450 | 30 | 65 | 0 |
| 206 | 0.9 | 600 | 30 | 141 | 0 |
| 207 | 0.9 | 600 | 40 | 52 | 0 |
| 208 | 0.9 | 600 | none | 122 | 0 |

Example 3

This Example shows polymerization reactions to prepare a comparative, monomodal high molecular weight polymer product. Comparative polymerization runs were made using various catalyst supports. All supports were activated in air and subsequently reduced in carbon monoxide (CO). Polymerization reactions were carried out as described earlier in Example 1. The results are summarized below in Table 3.

TABLE 3

| Run No. | Catalyst System | Activation Temp., °C. (air/CO) | TEA, ppm | Hexene mL | Catalyst Prod., g/g/hr | HLMI, g/10 mins | Density g/cc |
|---|---|---|---|---|---|---|---|
| 301 | Magnapore | 550/none | 1.7 | 15 | 4810 | 7.6 | 0.947 |
| 302 | Magnapore | 550/350 | none | 20 | 2210 | 8.9 | 0.937 |
| 303 | 969MSLF | 650/350 | 1.7 | 30 | 3180 | 2.8 | 0.935 |
| 304 | 969ID | 620/350 | none | 20 | 2905 | 0.85 | 0.940 |
| 305 | Sylopore | 600/350 | none | 20 | 2580 | 1.2 | 0.941 |

TABLE 1

| Run No. | P/Al Molar Ratio | Support Activ'n. Temp °C. | Catalyst Productivity, g/g/hr | MI, g/10 mins | Density, g/cc |
|---|---|---|---|---|---|
| 101 | 0.9 | 450 | 3640 | 65 | 0.969 |
| 102 | 0.9 | 600 | 4200 | 105 | — |
| 103 | 0.9 | 750 | 2180 | 90 | 0.969 |
| 104 | 0.6 | 300 | 2980 | 63 | — |
| 105 | 0.6 | 450 | 5790 | 99 | 0.969 |
| 106 | 0.6 | 600 | 3770 | 86 | 0.967 |
| 107 | 0.3 | 300 | 200$^{(b)}$ | — | — |
| 108 | 0.3 | 450 | 4220 | 80 | 0.969 |
| 109$^{(a)}$ | 0.3 | 600 | 2300 | 86 | 0.970 |
| 110 | 0.3 | 750 | 1300 | 109 | 0.970 |

$^{(a)}$Chromocene and aluminophosphate were fed into reactor separately, to prepare a supported CrCp$_2$ catalyst system in-situ.
$^{(b)}$Run time was 30 minutes.

Example 4

Chromocene catalyst systems, prepared in accordance with Example 1, were used to polymerize ethylene in the same reactor with supported chromium oxide catalyst systems in the presence of hydrogen and a comonomer. The supported chromium oxide catalyst systems in Runs 401–404 were activated in air at 650° C. for 3 hours; Runs 405 and 406 were activated in air at 550° C. for 3 hours. All supported chromium oxide catalyst systems were reduced in carbon monoxide @ 350° C. for 30 minutes. Polymerization reactions were carried out as described in Example 1. Reactor temperature for all Runs was 95° C.; 35 psi hydrogen (H$_2$) was added to all Runs. The supported chromium oxide catalyst system was charged to the reactor as a dry powder, followed by a slurry of the supported chromocene catalyst system. Polymeric products from each Run were melt blended in a Midget Banbury mixer prior to determination of physical properties. The results are listed below in Table 4.

TABLE 4

| Run No. | CrCp$_2$ Support P/Al Molar Ratio[a] | Chrome Oxide[b] | Wt. Ratio, CrCp$_2$/ CrO | TEA, ppm | 1-C$_6^=$ mL | Total Catalyst Prod., g/g/hr | Den, g/cc | MI, g/10 mins | HLMI, g/10 mins | ESCR hrs.[c] |
|---|---|---|---|---|---|---|---|---|---|---|
| 401 | 0.3 | 969MSLF | 0.79 | 40 | 1.7 | 2900 | 0.948 | 0.1 | 37 | >1000 |
| 402 | 0.9 | 969MSLF | 0.92 | 30 | 1.7 | 2650 | 0.953 | 0.2 | 35 | >1000 |
| 403 | 0.6 | 969MSLF | 0.85 | 30 | 1.7 | 2170[e] | 0.955 | 0.3 | 42 | 380 |
| 404 | 0.6 | 969MSLF | 1.12 | none | none[d] | 1560 | 0.961 | 0.7 | 104 | 40 |
| 405 | 0.6 | Magnapore | 0.36 | 20 | 1.7 | 1683 | — | 1.3 | 100 | — |
| 406 | 0.6 | Magnapore | 0.39 | 20 | 1.7 | 1931 | 0.952 | 0.2 | 31 | — |

[a]Support in Runs 401 and 402 calcined at 600° C.; Runs 403–406 calcined at 450° C.
[b]Runs 401–404 activated at 650° C., CO reduced at 350° C.; Runs 405 and 406 activated at 550° C., CO reduced at 350° C.
[c]ESCR, Condition A.
[d]12 ppm TEB was added, instead of TEA.
[e]Run time was 45 minutes.

Example 5

Several batches of chromocene catalyst systems were prepared as follows, and combined into a hold tank prior to use. A slurry of about 75 grams of calcined aluminophosphate (0.6 P/Al) and 400 mL of dry, degassed hexanes was stirred. A solution of about 5g CrCp$_2$ in about 100 mL hexane was added. The wine red CrCp$_2$ solution turned clear and the AlPO$_4$ support turned black. The slurry was transferred to a filter and washed with 1.0 L hexane. Each batch of chromocene catalyst system slurry was then charged to a catalyst system hold tank. The catalyst system hold tank contained about 1.0 L of hexane in addition to the catalyst system slurry.

All chromium oxide catalyst system activations were performed in a fluidized bed activator. Magnapore catalyst systems (Runs 501–505) were activated at 550° C. for 5 hours in air and reduced in CO at 350° C. for 2 hours. 969MSLF (Runs 506 and 507) and 969ID (Runs 508–512) were activated at 600° C. for 5 hours in air and CO reduced at 350° C. for 2 hours. These conditions, were chosen to try to optimize HLMI and comonomer incorporation in the resultant polymeric product.

Polymers were prepared in a continuous, particle form process by contacting catalyst system with monomers, which employed a liquid, full loop reactor, having a volume of 23 gallons (87 liters), isobutane as the diluent, and occasionally some hydrogen to regulate the molecular weight of the product. The reactor was operated to have a residence time of 1.25 hours. The reactor temperature was varied over a range of 87°–93° C., and the pressure was 4Mpa (580 psi). At steady state conditions, the isobutane feed rate was about 46 liters/hr, ethylene feed rate was about 30 lbs/hr, and the 1-hexene feed rate was varied to control the density of the product polymer. Polymer was removed from the reactor at the rate of 25 lbs/hr.

The results are given below in Table 5.

TABLE 5

| Run No. | Chrome Oxide Catalyst | Reactor Temp (°C.) | TEA (ppm) | H$_2$, mol % | C$_2^=$, mol % | Wt % 1-C$_6^=$ feed | Mol % 1-C$_6^=$ flash gas | Pellet Density, g/cc | Pellet HLMI, g/10 mins | Pellet MI, g/10 mins | Bell ESCR hrs.[a] | Flex Mod, Kpsi |
|---|---|---|---|---|---|---|---|---|---|---|---|---|
| 501 | Magnapore | 88 | 2.7 | 0.45 | 9.4 | 5.1 | 0.31 | 0.949 | 21 | 0.13 | >1000 | 147 |
| 502 | Magnapore | 87 | 2.5 | 0.49 | 8.2 | 5.4 | 0.20 | 0.951 | 24 | 0.17 | >1000 | 168 |
| 503 | Magnapore | 88 | 2.5 | 0.5 | 7.2 | 5.3 | 0.20 | 0.948 | 14 | 0.08 | >1000 | 140 |
| 504 | Magnapore | 88 | 2.6 | 0.51 | 7.5 | 5.6 | 0.22 | 0.947 | 13 | 0.08 | >1000 | 156 |
| 505 | Magnapore | 88 | 2.3 | 0.52 | 8.1 | 5.5 | 0.24 | 0.944 | 11 | 0.08 | >1000 | 136 |
| 506 | 969MSLF | 93 | 0 | 0.45 | 8.1 | 3 | 0.31 | 0.949 | 16 | 0.08 | >1000 | 140 |
| 507 | 969MSLF | 93 | 0 | 0.38 | 7.9 | 2.9 | 0.23 | 0.951 | 24 | 0.13 | >1000 | 135 |
| 508 | 969ID | 93 | 0 | 0.35 | 8.9 | 3.3 | 0.30 | 0.952 | 15 | 0.06 | >1000 | 157 |
| 509 | 969ID | 93 | 0 | 0.35 | 8.9 | 3.3 | 0.30 | 0.954 | 34 | 0.19 | 380 | 158 |
| 510 | 969ID | 93 | 0 | 0.35 | 8.9 | 3.3 | 0.30 | 0.952 | 26 | 0.12 | 790 | 157 |
| 511 | 969ID | 93 | 0 | 0.35 | 8.1 | 2.9 | 0.24 | 0.956 | 26 | 0.12 | 340 | 177 |
| 512 | 969ID | 93 | 0 | 0.35 | 8 | 2.8 | 0.23 | 0.954 | 28 | 0.13 | 350 | 180 |

[a]Runs 503–505 were Condition C. All other Runs were Condition A.

Of the three catalyst system combinations, the best productivity is a result of the 969ID/chromocene combination, followed by 969MSLF and then magnapore. It appeared that the magnapore catalyst system was extremely sensitive to the chromocene catalyst.

Example 6

Polymer resins produced in Example 5 were used for film evaluation and were run on a 4 inch Sang blown film line with a screw speed of 115 rpm. The results are given below in Table 6. The MI for Runs 503–506 was 0.08 g/10 mins.

TABLE 6

| Run No. | Chrome Catalyst | Pellet density, g/cc | Pellet HLMI, g/10 min | Bubble Stability @ max. Speed | Max Line Speed (ft/min) | Dart Impact (g) | Spencer Impact (g) | MD Tear (g) | MD Tear (g) | Gels (#/ft²) | Smoke |
|---|---|---|---|---|---|---|---|---|---|---|---|
| 601 | —[a] | 0.947 | 15 | stable | 106 | 120 | 0.38 | 32 | 280 | 8 | OK |
| 503 | Magnapore | 0.948 | 14 | breathing | 94 | 150 | 0.46 | 30 | 660 | 49 | OK |
| 504 | Magnapore | 0.947 | 13 | breathing | 86 | 170 | 0.52 | 30 | 660 | 47 | OK |
| 505 | Magnapore | 0.944 | 11 | breathing | 84 | 190 | 0.54 | 35 | 700 | 31 | OK |
| 506 | 969MSLF | 0.949 | 16 | stable | 47[b] | 35 | 0.18 | 43 | 110 | high | OK |

[a]Commercially available polymer (Marlex TR-144, from Phillips Petroleum Company) to produce TR-144 film.
[b]Film showed melt fracture.

The data in Table 6 pertaining to film evaluation show that the chromocene/magnapore blends yield a far superior film than the chromocene/969 blends.

Example 7

Polymer resins produced in Example 5 were used for blow molding and were evaluated by blowing a one gallon (105.1 g) bottle on a Uniloy machine. The results of these Runs are given in Table 7, below.

TABLE 7

| Run No.[a] | CrO Oxide Catalyst | Pellet density, g/cc | Pellet HLMI, g/10 min. | Pellet MI, g/10 mins. | Head Pressure | Shear Rate @ MF | Die Swell | Smoke | Bottle ESCR, hrs. | Top Load, lbs. | Dart Impact, ft. |
|---|---|---|---|---|---|---|---|---|---|---|---|
| 701 | —[b] | 0.955 | — | 0.35 | 5160 | 2400 | 41 | 2 | 140 | 170 | 12 |
| 501[c] | Magnapore | 0.949 | 21 | 0.13 | — | — | — | — | — | — | — |
| 502 | Magnapore | 0.951 | 24 | 0.17 | 5500 | 2230 | 48 | 3 | — | — | — |
| 507 | 969MSLF | 0.951 | 24 | 0.13 | 5160 | 2300 | 39 | 3 | >700 | 160 | 7.5 |
| 508 | 969ID | 0.952 | 15 | 0.06 | 5050 | 2320 | 38 | 3 | >700 | 150 | 4.2 |
| 509 | 969ID | 0.954 | 34 | 0.19 | — | 2340 | — | 3 | — | — | — |
| 510 | 969ID | 0.952 | 26 | 0.12 | 5100 | 2320 | — | 3 | — | — | — |
| 511 | 969ID | 0.956 | 26 | 0.12 | 5060 | 2300 | — | 3 | — | — | — |
| 512 | 969ID | 0.954 | 28 | 0.13 | 4890 | 2290 | — | 3 | — | — | — |

[a]Bottles in Runs 509–512 were too heavy for all analyses.
[b]Bottles made using commercially available Marlex 5502, from Phillips Petroleum Company.
[c]This resin was not blown, due to a low density value.

The data in Table 7 pertaining to blow molding evaluation show that Runs 502, 507, and 508 produced polymers that had a very good ESCR (condition A) and extremely low die well. Runs 509–512 produced resins that had moderate ESCR values.

While this invention has been described in detail for the purpose of illustration, it is not to be construed as limited thereby but in intended to cover all changes and modifications within the spirit and scope thereof.

That which is claimed is:

1. A process of producing polyolefins having a multimodal molecular weight distribution comprising polymerizing under polymerization conditions in a polymerization zone at least one olefin in the presence of a dual catalyst system comprising:

a) a chromocene catalyst system comprising chromocene supported on an aluminophosphate support; and b) a chromium oxide catalyst system comprising chromium oxide supported on an inorganic oxide support; and recovering a polymer.

2. A process according to claim 1 further comprising a metal alkyl cocatalyst.

3. A process according to claim 1 wherein said olefin is selected from the group consisting of ethylene, propylene, 1-butene, 1-pentene, 1-hexene, 1-octene, and mixtures thereof.

4. A process according to claim 3 wherein said olefin is ethylene.

5. A process according to claim 1 wherein said olefin includes ethylene and from about 0.5 to about 20 mole percent of a monomer selected from the group consisting of propylene, 1-butene, 1-pentene, 1-hexene, 1-octene, and mixtures thereof.

6. A process according to claim 1 wherein said polymerization conditions comprise slurry phase polymerization conditions.

7. A process according to claim 3 wherein said slurry phase polymerization conditions comprise a temperature within a range of about 80° to about 110° C. and a pressure of about 250 to about 700 psia, for a time within a range of about 1 minute to about 6 hours.

8. A process according to claim 1 wherein said chromocene is a bis-(cyclopentadienyl) chromium(II) compound.

9. A process according to claim 1 wherein said chromocene catalyst system aluminophosphate support has a phosphorus to aluminum molar ratio of within a range of about 0.2 to about 1.0.

10. A process according to claim 2 wherein said organometal cocatalyst is selected from the group consisting of alkyl boron compounds, alkyl aluminum compounds, and mixtures thereof.

11. A process according to claim 10 wherein said organometal cocatalyst is an alkyl boron compound.

12. A process according to claim 10 wherein said organometal cocatalyst is an alkyl aluminum compound.

13. A process for producing polyolefins having a multimodal molecular weight distribution consisting essentially of polymerizing under polymerization conditions in a polymerization zone at least one olefin in the presence of a dual catalyst system comprising:

a) a chromocene catalyst system comprising chromocene supported on an aluminophosphate support; and b) a chromium oxide catalyst system comprising chromium oxide supported on an inorganic oxide support; and recovering of polymer.

14. A process according to claim 13 further comprising a metal alkyl cocatalyst.

15. A process according to claim 13 wherein said olefin is selected from the group consisting of ethylene, propylene, 1-butene, 1-pentene, 1-hexene, 1-octene, and mixtures thereof.

16. A process according to claim 15 wherein said olefin is ethylene.

17. A process according to claim 13 wherein said olefin includes ethylene and from about 0.5 to about 20 mole percent of a monomer selected from the group consisting of propylene, 1-butene, 1-pentene, 1-hexene, 1-octene, and mixtures thereof.

18. A process according to claim 13 wherein said polymerization conditions comprise slurry phase polymerization conditions.

19. A process according to claim 15 wherein said slurry phase polymerization conditions comprise a temperature within a range of about 80° to about 110° C. and a pressure of about 250 to about 700 psia, for a time within a range of about 1 minute to about 6 hours.

20. A process according to claim 13 wherein said chromocene is a bis-(cyclopentadienyl) chromium(II) compound.

21. A process according to claim 13 wherein said chromocene catalyst system aluminophosphate support has a phosphorus to aluminum molar ratio of about 0.4 within a range of about 0.2 to about 1.0.

22. A process according to claim 14 wherein said organometal cocatalyst is selected from the group consisting of alkyl boron compounds, alkyl aluminum compounds, and mixtures thereof.

23. A process according to claim 22 wherein said organometal cocatalyst is an alkyl boron compound.

24. A process according to claim 22 wherein said organometal cocatalyst is an alkyl aluminum compound.

* * * * *

UNITED STATES PATENT AND TRADEMARK OFFICE
CERTIFICATE OF CORRECTION

PATENT NO. : 5,648,439

DATED : July 15, 1997

INVENTOR(S) : Joseph J. Bergmeister, Scott E. Kufeld and Max P. McDaniel

It is certified that error appears in the above-identified patent and that said Letters Patent is hereby corrected as shown below:

Column 16, claim 21, line 14, the words "about 0.4" should be deleted.

Signed and Sealed this

Sixteenth Day of June, 1998

Attest:

BRUCE LEHMAN

Attesting Officer     *Commissioner of Patents and Trademarks*